Aug. 29, 1950
G. G. LANDIS ET AL
2,520,151
ADJUSTABLE-ELECTRODE ARC WELDING TORCH
Filed May 3, 1945
2 Sheets-Sheet 1
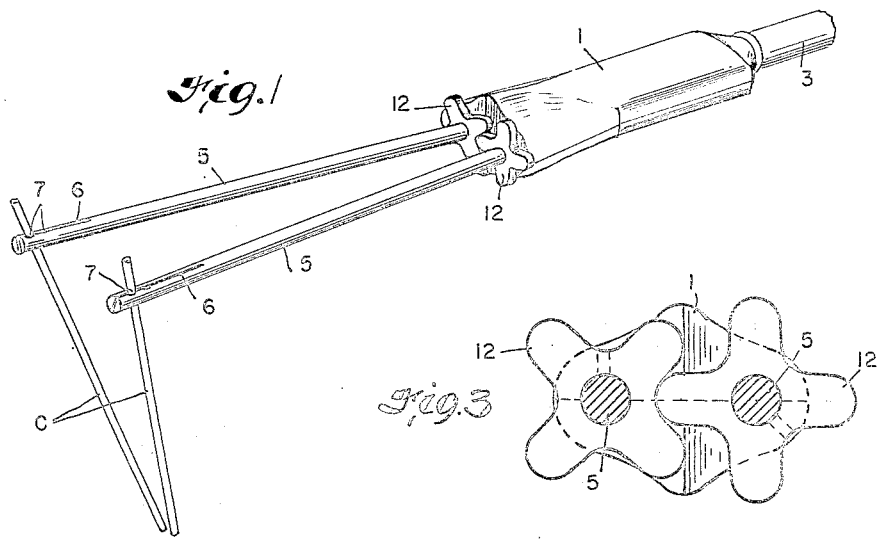
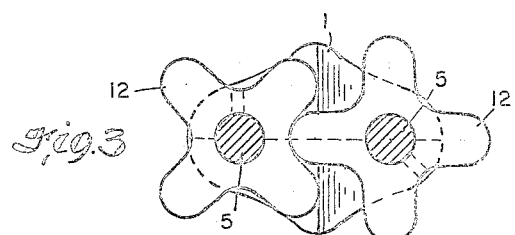
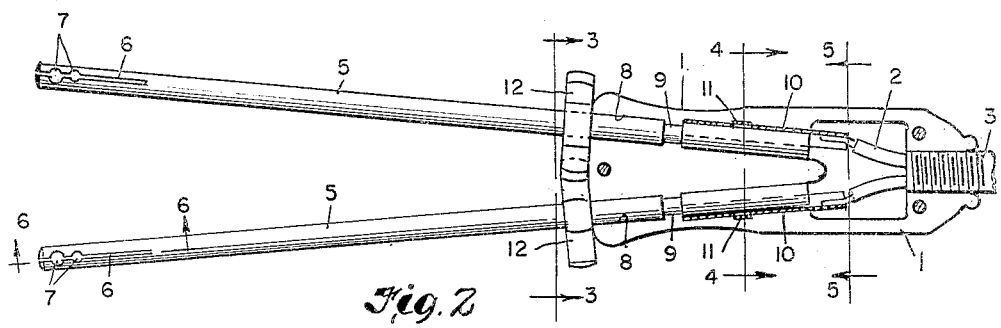
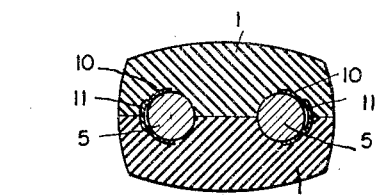
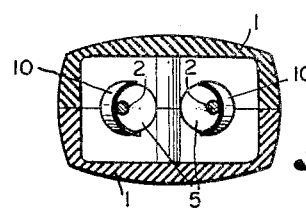
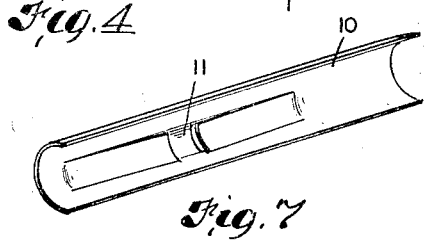
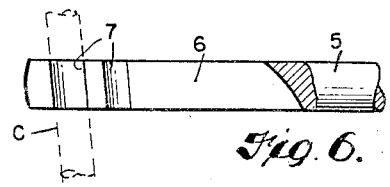
INVENTOR.
GEORGE G. LANDIS and
NORMAN J. HOENIE
BY
Oberlin & Limbach
ATTORNEYS

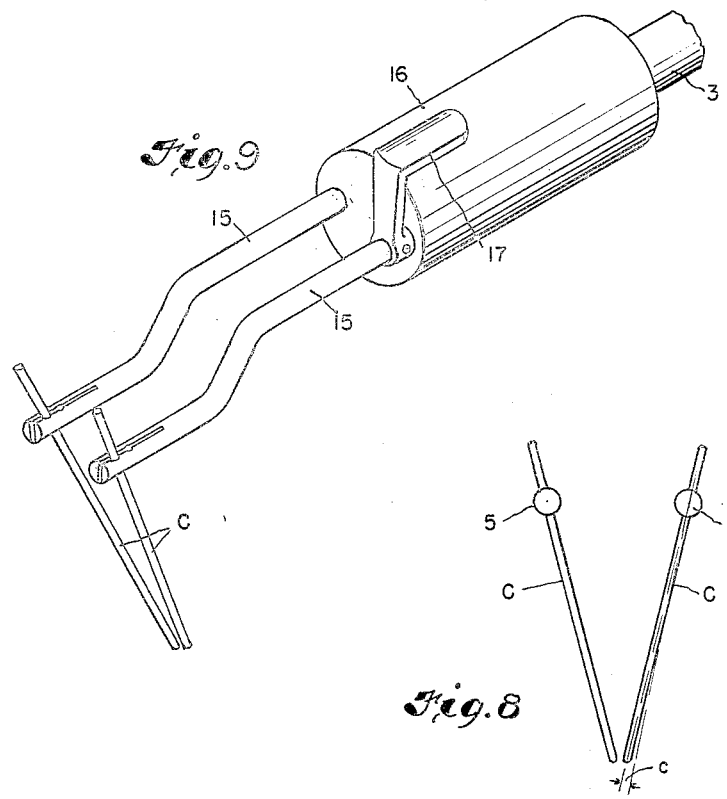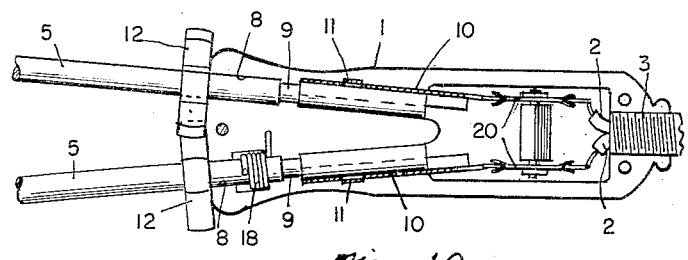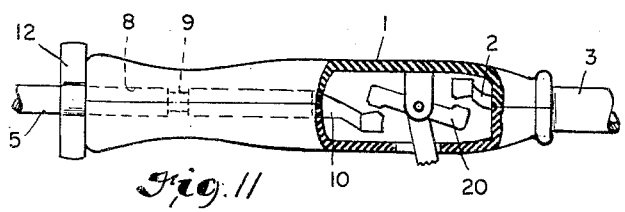

Patented Aug. 29, 1950

2,520,151

UNITED STATES PATENT OFFICE 2,520,151

ADJUSTABLE-ELECTRODE ARC WELDING TORCH

George G. Landis, South Euclid, and Norman J. Hoenie, Cleveland Heights, Ohio, assignors to The Lincoln Electric Company, Cleveland, Ohio, a corporation of Ohio Application May 3, 1945, Serial No. 591,700

3 Claims. (Cl. 219—14)

1

The present improvements relate generally to electrode holders for use in electric arc welding, and more particularly to holders of the type designed to receive and hold a pair of carbon electrodes between which the arc is struck, thus constituting what is generally known in the trade as an arc torch.

In devices of the type in question two electrodes in the form of carbon rods or pencils require to be angularly opposed at the ends where the arc is struck, and since such rods or pencils are gradually consumed during the operation it is necessary to provide means whereby such ends may be maintained in proper juxtaposed relation. It is also necessary in order to strike the arc to provide means for actually contacting such ends and then slightly separating them.

One principal object of the present invention is to provide a simple and compact electrode holder for use as an arc torch which may be easily held and manipulated by one hand of the operator without strain or undue fatigue. A further object is to provide means for effecting the necessary movement of the carbon rods or pencils to strike the arc in the manner just described, as well as to properly maintain such arc as the carbons burn away.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a perspective view of an illustrative form of electrode holder embodying our present improvements;

Fig. 2 is a top plan view thereof with a portion of the handle broken away to show the interior construction thereof;

Figs. 3, 4 and 5 are transverse sectional views taken on the planes indicated by the lines 3—3, 4—4 and 5—5 respectively, Fig. 2;

Fig. 6 is a broken sectional view of the outer end of one of the electrode holding members proper, as indicated by the line 6—6, Fig. 2;

Fig. 7 is a perspective view of a spring clip incorporated in the handle of the device which serves to retain the electrode holder proper in adjusted position;

Fig. 8 is a more or less diagrammatic end ele-

2 vational view of the electrodes as held in the device, showing various adjusted positions thereof;

Fig. 9 is a view corresponding to that of Fig. 1 but showing a modification in construction;

Fig. 10 is a view corresponding to Fig. 2 but showing still another modification; and Fig. 11 is a side view of the handle shown in Fig. 10, broken away to disclose the switch incorporated therein.

Referring to the device as illustrated generally in Figs. 1 and 2, the body thereof will be seen to comprise a handle 1 so formed as to be readily grasped by the hand of the operator. Such handle will be made of insulating material, preferably in two parts separable along a median plane so as to facilitate assembly of the parts carried by the hand and access to the interior of the latter when required. The two leads 2 which supply the necessary current for the welding operation are brought to the handle through a flexible insulated conduit 3 connected with one end thereof, the right hand end as shown.

Rotatably mounted in the handle so as to project from the opposite end thereof to that through which such leads 2 enter are two electrode holders 5, 5 of identical construction, each comprising a rod, or equivalent elongated member, of conductive material which is formed with a longitudinal slot 6 at its outer end, intersected by a plurality (two as shown) of holes 7. As best shown in Fig. 6, these holes are of different diameters to correspond with the different diameters of the carbon rods or pencils C which the device is designed to utilize. When inserted, such rod or pencil will be held in place by the pressure exerted thereon by the split sides of the rod, such pressure, however, permitting the latter to be moved longitudinally when desired.

Preferably, as shown in Fig. 1, these electrode holding rods 5 are mounted for rotation in the handle 1 about slightly divergent axes, so that the outer ends thereof, just described, will lie further apart than their inner ends. The latter are thus rotatably held in bearings 8 formed in the respective half portions of the handle 1, each such bearing being of reduced diameter at one point to engage with the corresponding reduced portion 9 of the corresponding rod whereby the latter is retained against endwise movement in the bearing. Mounted in handle 1 in position to engage with the portions of the respective rods that extend beyond such reduced portions 8 thereof are spring clips 10 of phosphor-bronze or equivalent conducting material to which clips the respective leads 2 are attached as shown in Fig. 2. As shown in Fig. 7, each such clip is preferably in the form of a semi-cylindrical stamping formed with an outwardly directed protuberance 11 which serves to hold it again rotation in the handle 1. These clips serve not only to conduct the necessary current to the electrode holding rods 5, but also due to their resilience serve to retain them in desired rotative position in their respective bearings.

For the purpose of rotating rods 5 there is secured onto each thereof adjacent the outer end of handle 1 a gear 12, such gears loosely meshing with each other and preferably being of the form illustrated in Fig. 3, i. e. each has four rounded teeth, at least one of which will at all times project beyond the adjacent end of handle 1 in position to be engaged by the thumb of the operator when grasping such handle, although one of the other fingers may be used. Due to the form of these teeth a certain limited rotative movement may be imparted to one or the other of rods 5 without necessarily rotating the other, whereas more consequential movement will cause the two rods to be rotated in unison but in opposite directions.

Accordingly (see Fig. 8) it is possible to rotate the one such rod 5 so as to move the corresponding electrode C through an arc $c$ sufficient to bring the outer end of such electrode in contact with the adjacent electrode and then upon reverse movement to separate such ends, thus causing an arc to be struck therebetween. Variation in the length of such arc may then be controlled by further rotation of gears 12, whereby corresponding rotation of the electrode holding rods 5 is effected, and in the same manner the length of the arc may be maintained substantially constant as the electrodes burn away to occupy the position shown in dotted outline in the figure just referred to.

The modification illustrated in Fig. 9 in some respects constitutes a simplification in construction in that the two electrode holding rods 15 are not intergeared or otherwise connected for conjoint movement. Instead said rods are simply mounted for individual rotative movement in a handle 16 which corresponds with handle 1. The bearings for this purpose (not illustrated) may be the same as in the first described construction, or any other which will permit the rods 15 to be thus rotated by frictionally holding them in selected position. The rods, as before, extend from the handle in adjacent relation, but instead of their axes diverging slightly so as to space their outer ends further apart than their inner ends, such rods are bent or offset at an intermediate point whereby a similar effect is obtained.

Secured to the one rod 15 adjacent the end of the handle 16 from which it emerges is a radially projecting thumb-piece 17, the outer end of which overlies the handle so that the thumb of the operator's hand, grasping such handle, may be conveniently applied for the purpose of rotating the corresponding rod. When in use the rods will be initially set to properly position the electrodes C, then as they burn away the one thereof to which such thumb-piece is attached may be rotated to maintain the ends of the electrodes in proper arcing relation. In the same manner, such rod may be rotated to strike or break the arc as required.

It will be understood that the one electrode gripping member 15, if desired, need not be rotatable in handle 16 at all, but only the member which is provided with thumb-piece 17 need be angularly adjustable about its axis. Of course in such construction the setting of the first-mentioned member cannot be changed, but for certain fields of use this may not be found necessary or at least important. Moreover, in such construction such first-named member becomes in effect an extension of the handle and may be made of the same material as the latter, the lead to the corresponding electrode C being carried directly to such electrode.

The modification illustrated in Fig. 10 consists in the addition of a coil spring 18 in association with one of the electrode holding rods 5 of the first described construction, viz. the one which is designed to be subject to rotation by a finger of the operator's hand, grasping the handle 1 when the device is in use. One end of such spring is attached to the rod and the other to the handle so as to impart to the rod a tendency to rotate in such direction as to separate the outer ends of the electrodes C carried by the rods. The operator is accordingly required to apply a slight degree of pressure upon the corresponding gear 12 whereby rotative movement of the rod is effected, thus rendering the operation of the device more sensitive.

There is also shown in this form of the device a switch 20 that is housed in the handle 1 and is adapted to make or break the circuit whereby current is supplied to the rods 5 and thus to the electrodes held thereby. It will be understood that such a switch may similarly be incorporated in each of the two previously described forms of the device.

From the foregoing description it will be evident that we provide an extremely simple and yet convenient tool for use in arc welding, using the so-called arc torch, in that all the necessary adjustments of the electrodes may be easily effected so as to strike the arc when desired and maintain it in proper operating condition.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a portable arc welding tool, the combination of a handle formed with a pair of spaced adjacent bores, two elongated members respectively rotatably fitted in such bores and extending from one end of said handle in spaced but adjacent relation, electrode gripping means provided in the outer ends of said members, and two intermeshing gears fixedly mounted one on each of said members adjacent the end of said handle whereby said members may be rotated in unison, said gears being freely rotatable except for such intermeshing engagement and one of said gears having a tooth projecting transversely beyond said handle to serve as gear operating means.

2. In a portable arc welding tool, the combination of a handle formed with a pair of spaced adjacent bores, two elongated members respectively frictionally rotatably fitted in such bores and extending from one end of said handle in spaced but adjacent relation, electrode gripping means provided in the outer ends of said members, whereby an electrode may be secured in transversely adjustable relation to each such end, and two intermeshing gears fixedly mounted one on each of said members adjacent the end of said handle wherefrom said members extend, whereby the latter may be rotated in unison, said gears being freely rotatable except for such intermeshing engagement and one of said gears having a tooth projecting transversely beyond said handle to permit the same to be engaged by a finger of the operator when holding said handle.

3. In a portable arc welding tool, the combination of a handle formed with a pair of spaced adjacent bores, two elongated members respectively frictionally rotatably fitted in such bores and extending from one end of said handle in spaced but adjacent relation, electrode gripping means provided in the outer ends of said members, whereby an electrode may be secured in transversely adjustable relation to each such end, and two intermeshing gears fixedly mounted one on each of said members adjacent the end of said handle wherefrom said members extend whereby the latter may be rotated in unison, said gears being freely rotatable except for such intermeshing engagement and the teeth thereof being formed to permit limited rotation by one of said members independently of the other member, whereby the ends of said electrode may be brought into contact and then separated sufficiently to establish an arc therebetween without requiring the other member to be rotated, and one of said gears having a tooth projecting transversely beyond said handle to permit the same to be engaged by a finger of the operator when holding said handle.

GEORGE G. LANDIS.
NORMAN J. HOENIE.

REFERENCES CITED

The following references are of record in the file of this patent:

UNITED STATES PATENTS

| Number | Name | Date |
| --- | --- | --- |
| 245,933 | Best | Aug. 23, 1881 |
| 1,332,241 | Waters | Mar. 2, 1920 |
| 1,519,166 | Rauch | Dec. 16, 1924 |
| 1,890,262 | Pardew | Dec. 6, 1932 |
| 1,898,481 | D'Amico et al. | Feb. 21, 1933 |
| 2,174,927 | Moore et al. | Oct. 3, 1939 |
| 2,178,292 | Thibodeau | Oct. 31, 1939 |
| 2,215,108 | Nigra | Sept. 17, 1940 |
| 2,255,528 | Lucking | Sept. 9, 1941 |
| 2,266,239 | Nielsen | Dec. 16, 1941 |
| 2,291,199 | Anderson | July 28, 1942 |
| 2,300,203 | Campbell | Oct. 27, 1942 |
| 2,379,470 | Baird | July 3, 1945 |
| 2,422,265 | Squires | June 17, 1947 |

FOREIGN PATENTS

| Number | Country | Date |
| --- | --- | --- |
| 328,896 | Germany | Nov. 8, 1920 |